United States Patent
Shioji et al.

(10) Patent No.: US 7,517,007 B2
(45) Date of Patent: Apr. 14, 2009

(54) SLIDE DOOR-CARRYING CAB

(75) Inventors: Hiroyuki Shioji, Komatsu (JP); Akihide Namura, Osaka (JP)

(73) Assignee: Komatsu Ltd., Tokyo (JP)

( * ) Notice: Subject to any disclaimer, the term of this patent is extended or adjusted under 35 U.S.C. 154(b) by 408 days.

(21) Appl. No.: 11/325,409

(22) Filed: Jan. 5, 2006

(65) Prior Publication Data
US 2006/0175870 A1 Aug. 10, 2006

Related U.S. Application Data

(62) Division of application No. 10/806,408, filed on Mar. 23, 2004, now abandoned.

(30) Foreign Application Priority Data
Apr. 7, 2003 (JP) ............................ 2003-103292

(51) Int. Cl.
*B60J 5/06* (2006.01)
(52) U.S. Cl. ................ 296/190.11; 296/155; 180/89.12
(58) Field of Classification Search ................ 296/155, 296/190.11, 146.2, 146.3, 190.1; 180/89.12; 49/40, 41
See application file for complete search history.

(56) References Cited

U.S. PATENT DOCUMENTS 5,080,425 A 1/1992 Austin
5,564,774 A 10/1996 Shinsen
5,577,795 A 11/1996 Shinsen
6,244,369 B1 6/2001 Yunoue et al.

FOREIGN PATENT DOCUMENTS

| EP | 1 002 760 | 8/1999 |
| EP | 1 190 939 | 3/2002 |
| JP | A-H07-216936 | 8/1995 |
| JP | A-H11-091641 | 4/1999 |
| JP | 2001-049696 | 2/2001 |

OTHER PUBLICATIONS

European Search Report dated Aug. 14, 2008 in corresponding European patent application No. 04007846.1-1268 (and English abstract).

*Primary Examiner*—Stephen Gordon
(74) *Attorney, Agent, or Firm*—Posz Law Group, PLC

(57) ABSTRACT

A slide door-carrying cab is provided which includes a slide door capable of forming a sufficient clearance between a rear portion of the cab and a back of an operators seat, reclining the back at a sufficient angle, and giving an excellent comfortableness to an operator. The cab is provided in the position on a turntable which is offset from the center of a swinging movement thereof. An outer side portion of the cab has an outwardly bulging surface, and the slide door which moves along the curved surface is provided at a front section of the outer side portion. A rear portion of the cab is made of outwardly bulging two-dimensionally bent rear curved glass, and an outer edge of the rear portion is made to stay within a turning radius of an outer edge portion of the turntable.

1 Claim, 6 Drawing Sheets

SLIDE DOOR-CARRYING CAB

CROSS-REFERENCE TO RELATED APPLICATION

This application is a divisional application of U.S. Ser. No. 10/806,408 filed on Mar. 23, 2004, now abandoned, which application is incorporated herein by reference.

BACKGROUND OF THE INVENTION

1. Field of the Invention

This invention relates to a slide door-carrying cab for construction machines.

2. Description of the Related Art

The known slide door-carrying cabs for construction machines include the cab for construction machines disclosed in, for example, Japanese patent publication (JP-A-2001-49696), pages 3 to 4, FIGS. 2 and 7. According to this patent publication, a turntable is provided on a traveling gear which is at a lower portion of a construction machine, and a cab in the position on the turntable which is offset from the center of a swinging movement thereof. The cab is formed so that an outer side portion thereof bulges outward curvilinearly. The outer side portion of the cab is provided with a slide door, and a radius of curvature of a rear half section of the outer side portion is set smaller than that of a front half section thereof. Consideration is given to the slide door so that an orbit of an outer edge portion of the slide door in opening and closing movements thereof stays within a turning radius of an outer edge portion of the turntable.

FIG. 3 is a perspective view of the cab disclosed in this patent publication. The construction of the cab will be described in detail on the basis of what is shown in FIG. 3. The cab 20 is provided with a front portion 21, a top plate portion 22, an inner side portion 23, a rear portion 24, and an outer side portion 25 having a slide door 30 in a front half section 27 thereof and a wall surface portion in a rear half section 26 thereof. The slide door 30 is slidingly moved with the slide door 30 guided by an intermediate guide rail 31, an upper guide rail 32 and a lower guide rail 33 which are provided on the outer side portion 25. The outer side portion 25 is formed so as to have an outwardly bulging curvilinear surface, and the radius of curvature of the rear half section 26 of the same portion 25 is set smaller than that of the front half section 27 thereof, i.e. the slide door 30. The front portion 21 is provided with front glass 21a, the inner side portion 23 flat side glass 23a, the rear portion 24 flat rear glass 24a, and the rear half section 26 of the outer side portion 25 two-dimensional curved glass 26a respectively.

This patent publication says that, when the slide door 30 is opened, the lateral size of a rear half portion of the cab 20 can be widened owing to the above-described structure to as great an extent as possible without causing a rear end portion of the slide door 30 to project to the outside of the turning radius of a swinging movement of an outer edge of the turntable, and that an effective space in the cab can thereby be enlarged limitlessly.

FIG. 4 is a side view of a rear-end small-turn type power shovel 1, an example of a construction machine on which the cab disclosed in the above patent publication is mounted. A turntable 3 swingably mounted on a traveling gear 2 is mounted with the cab 20. A front end portion of the turntable 3 is mounted on a working machine 4. According to what is shown in FIG. 7 in this patent publication, a rear portion of the cab 20 is made of a flat vertical wall.

FIG. 5 is a sectioned side view of a mode of embodiment to which an operator's seat 40 is added of the cab 20 disclosed in the above patent publication, and FIG. 6 is a plan view of the same embodiment. Referring to FIGS. 5 and 6, the cab 20 is fixed in the position on the turntable 3 which is offset from the center C of a swinging movement thereof 3, and an outer edge (a broken line shows a turning circle of the slide door 30 being opened) of a turning circle of the slide door 30 being opened and closed stays within a turning radius R of the outer edge of the turntable 3. The cab 20 is provided with a total of five support posts 34a, 34b, 34c, 34d, 34e in the four left and right corners thereof and at an intermediate section of the portion thereof which is on the side of the slide door 30. In the interior of the cab 20, an operator's seat 40 having a back 41 against which the back of an operator can be reclined is provided.

In this structure, flat vertical rear glass 24a is provided in the rear portion 24 of the cab 30, so that a clearance M between the back 41 of the operator's seat 40 and the rear glass 24a is narrow. The clearance M is really too narrow to place, for example, a tool box therein, and proves inconvenient. Moreover, in order to recline the back 41, a reclining angle β cannot be set large, and an operator therefore cannot take a break in a comfortable posture during a rest period.

SUMMARY OF THE INVENTION

The present invention has been made with the inventor's attention paid to these problems, and aims at providing a slide door-carrying cab capable of having an outer side portion of the cab stay within a turning radius of an outer side portion of a turntable, and securing a sufficient space between a rear portion of the cab and a back of an operator's seat, and a very comfortable for an operator to work and rest therein.

To achieve this objective, the present invention provides a slide door-carrying cab for construction machines, including an outer side portion provided in the position on a turntable mounted swingably on a traveling gear which is offset from the center of a swinging movement thereof, an outer side portion formed on an outer circumferential side of the turntable so that the outer side portion extends so as to have an outwardly bulging curvilinear surface, and a slide door provided in the outer side portion, opened and closed slidingly along the curvilinear surface, and having an orbit of opening and closing movements thereof an outer edge of which is adapted to stay within the turning radius of an outer edge portion of the turntable. A rear side portion of the cab is made of rear curved glass staying within a turning radius of the outer edge of the turntable and having an outwardly bulging curved surface.

According to the present invention, the rear side portion of the cab stays within the turning radius of the outer edge portion of the turntable, and is made of rear glass having an outwardly bulging curved surface. Therefore, there is not a fear of causing the cab to contact an outside obstacle when the turntable is swung. Moreover, a clearance between the back of the operator's seat and the rear side portion of the cab can be enlarged, so that it becomes possible to secure a storeroom-forming space sufficiently, increase the seat back reclining angle, and thereby improve the operator's comfort in the cab when he works and rests in the cab. Since the cab has curved surfaces, the external appearance thereof becomes excellent.

According to the present invention, the radius of curvature of the rear curved glass may be set equal to that of the side curved glass provided at the rear section of the curved surface-carrying outer side portion. In this structure, the same mold can be used when the side curved glass and rear curved glass are molded, so that the cost can be reduced to a lower level.

BRIEF DESCRIPTION OF THE DRAWINGS

A preferred embodiment of the present invention will now be described with reference to the accompanying drawings, wherein.

DESCRIPTION OF THE PREFERRED EMBODIMENT

Figure 4:
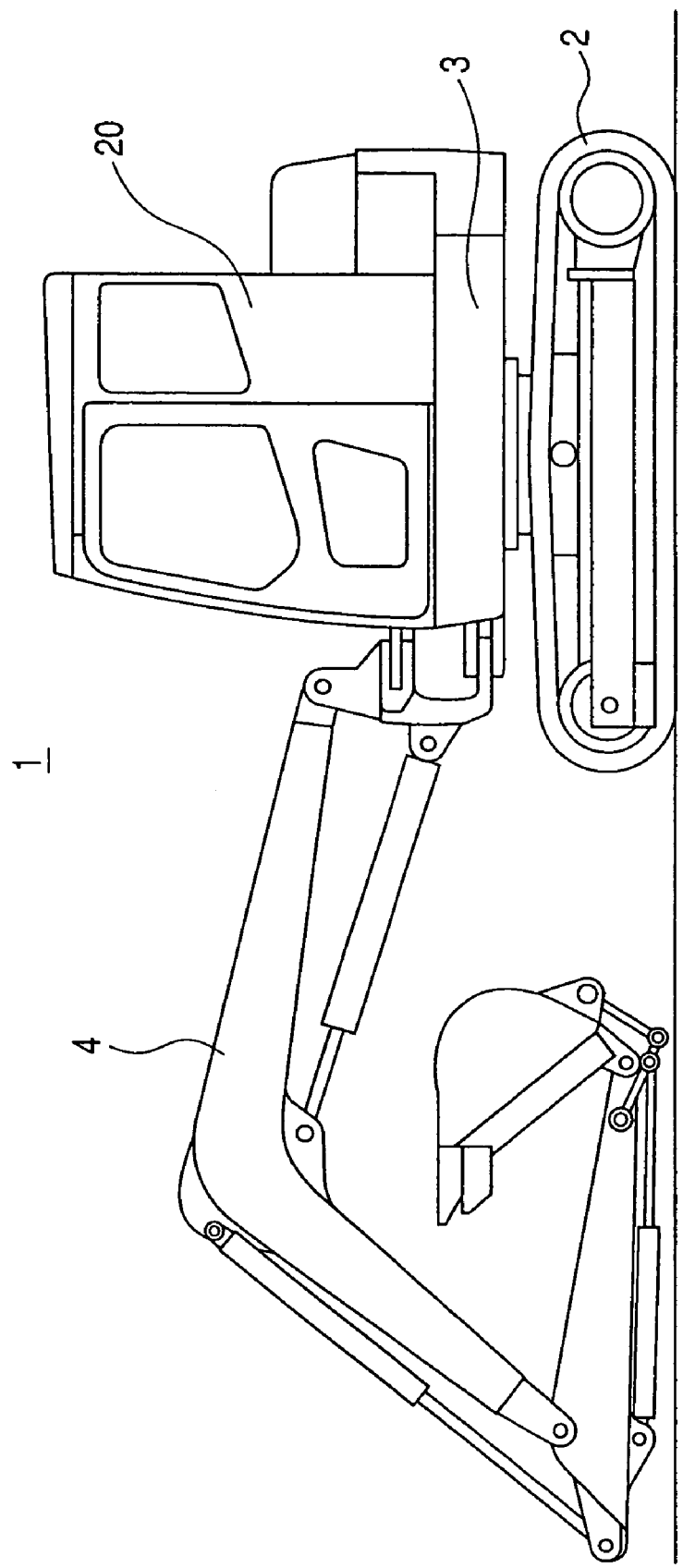
FIG. 4 is a side view of a power shovel on which such a cab as is shown in FIG. 3 is mounted.
Figure 5:
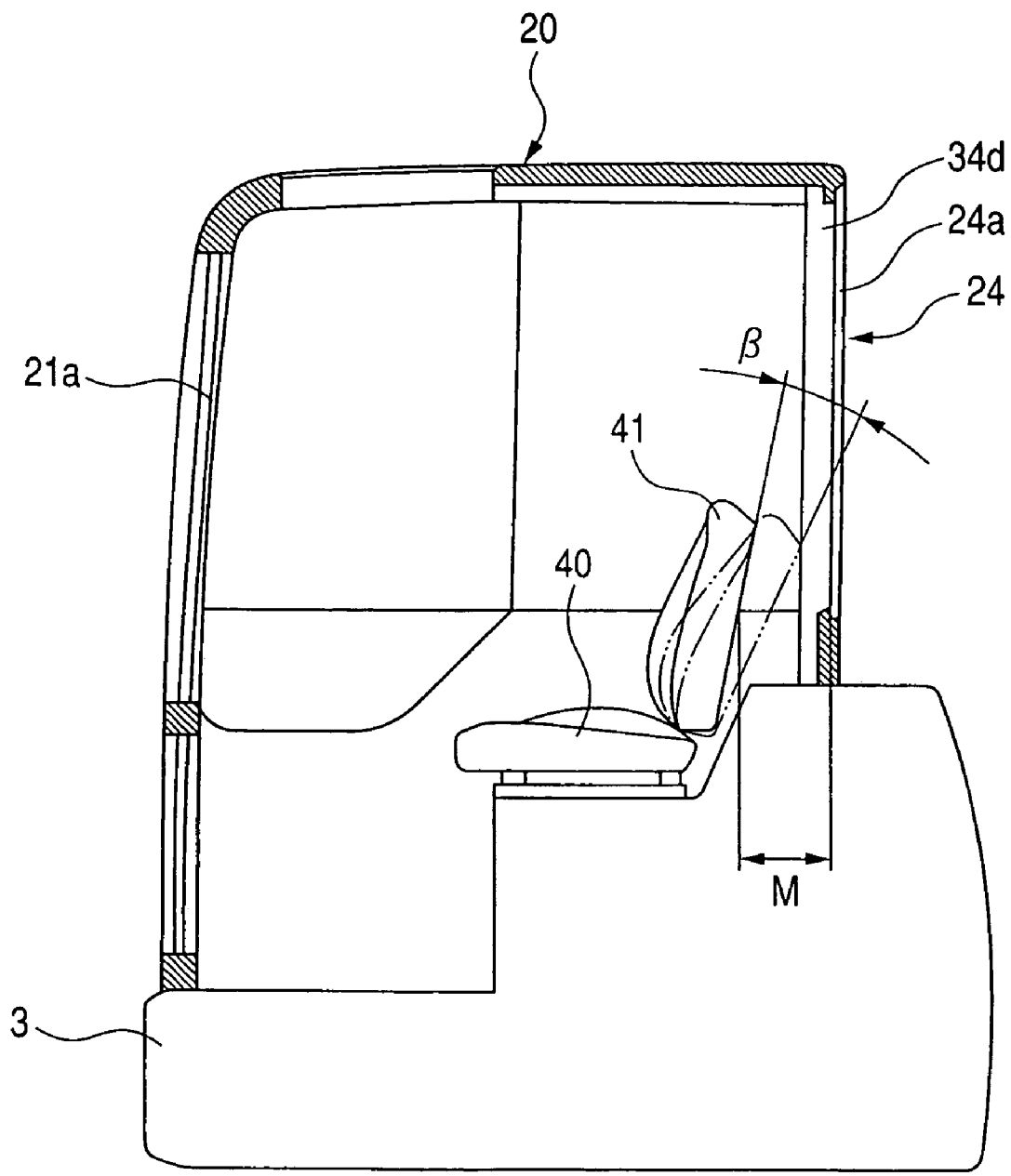
FIG. 5 is a sectioned side view of the related art cab.
Figure 6:
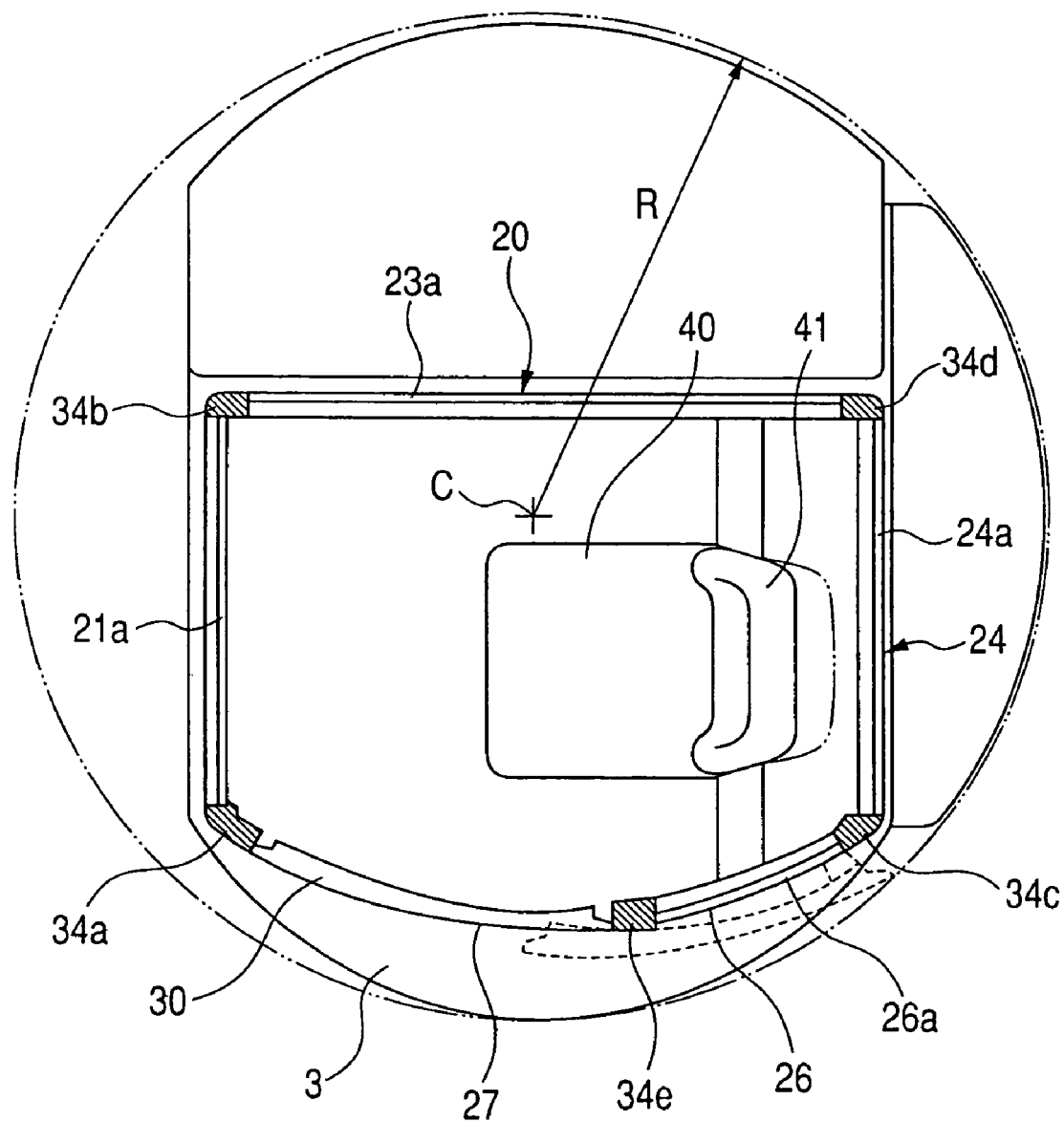
FIG. 6 is a sectioned plan view of the cab of FIG. 5.

A mode of embodiment of the slide door-carrying cab according to the present invention will be described in detail with reference to the drawings. The statement about the cab will be given with such a power shovel as is shown in FIG. 4 taken as an example of a machine to which the present invention is applied.

Figure 1:
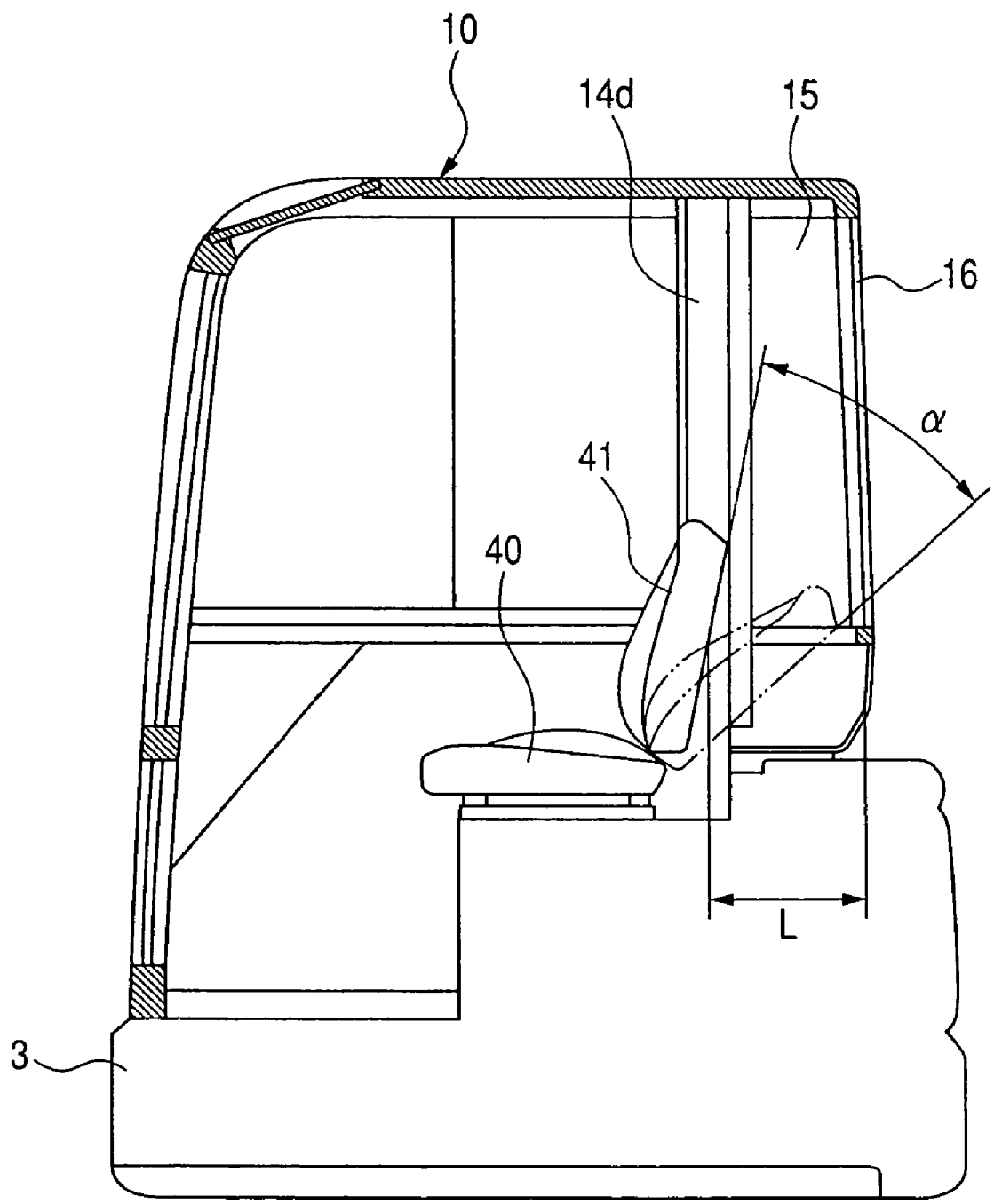
FIG. 1 is a sectioned side view of the cab according to the present invention.
Figure 2:
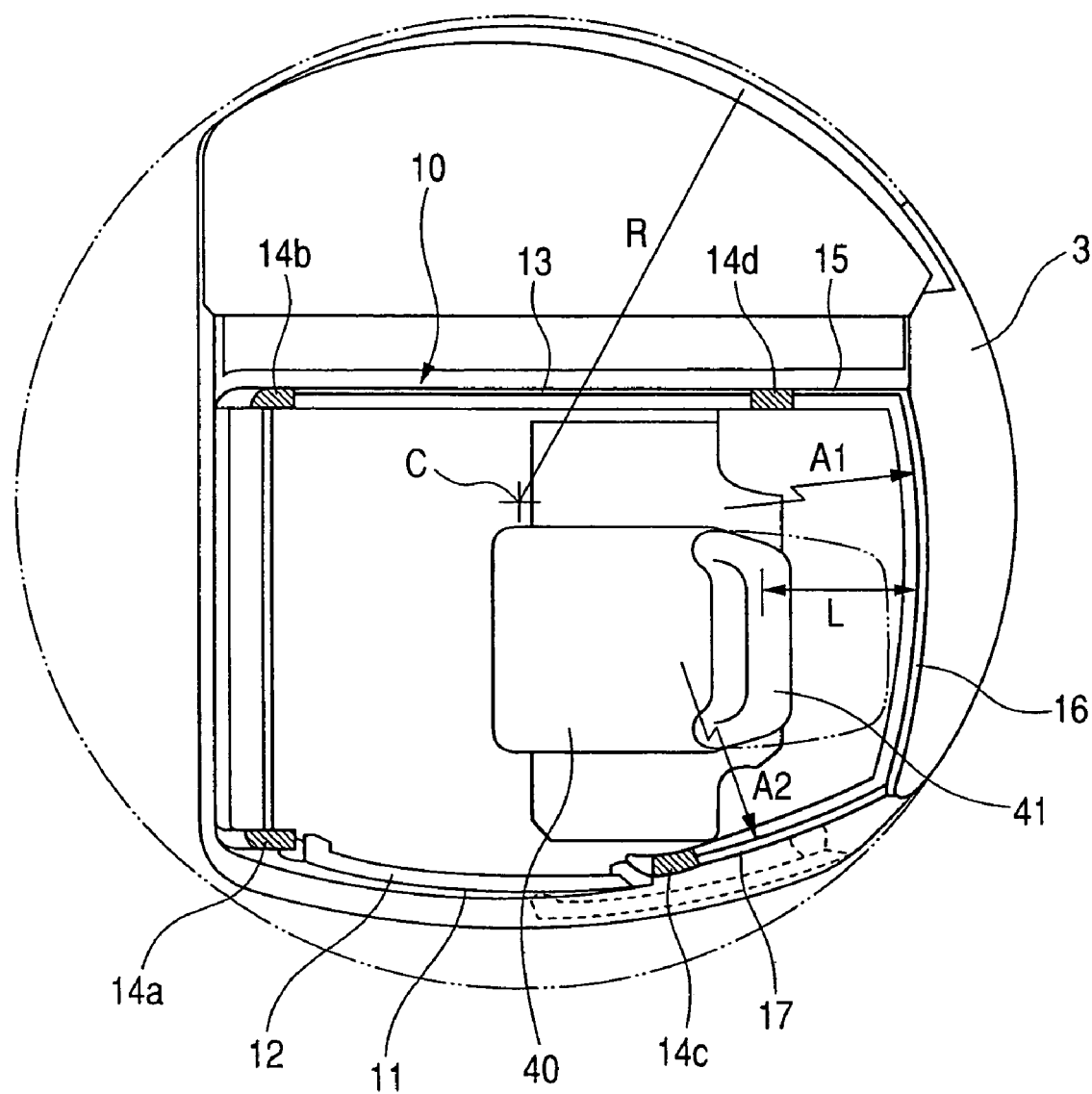
FIG. 2 is a sectioned plan view of the cab according to the present invention.
Figure 3:
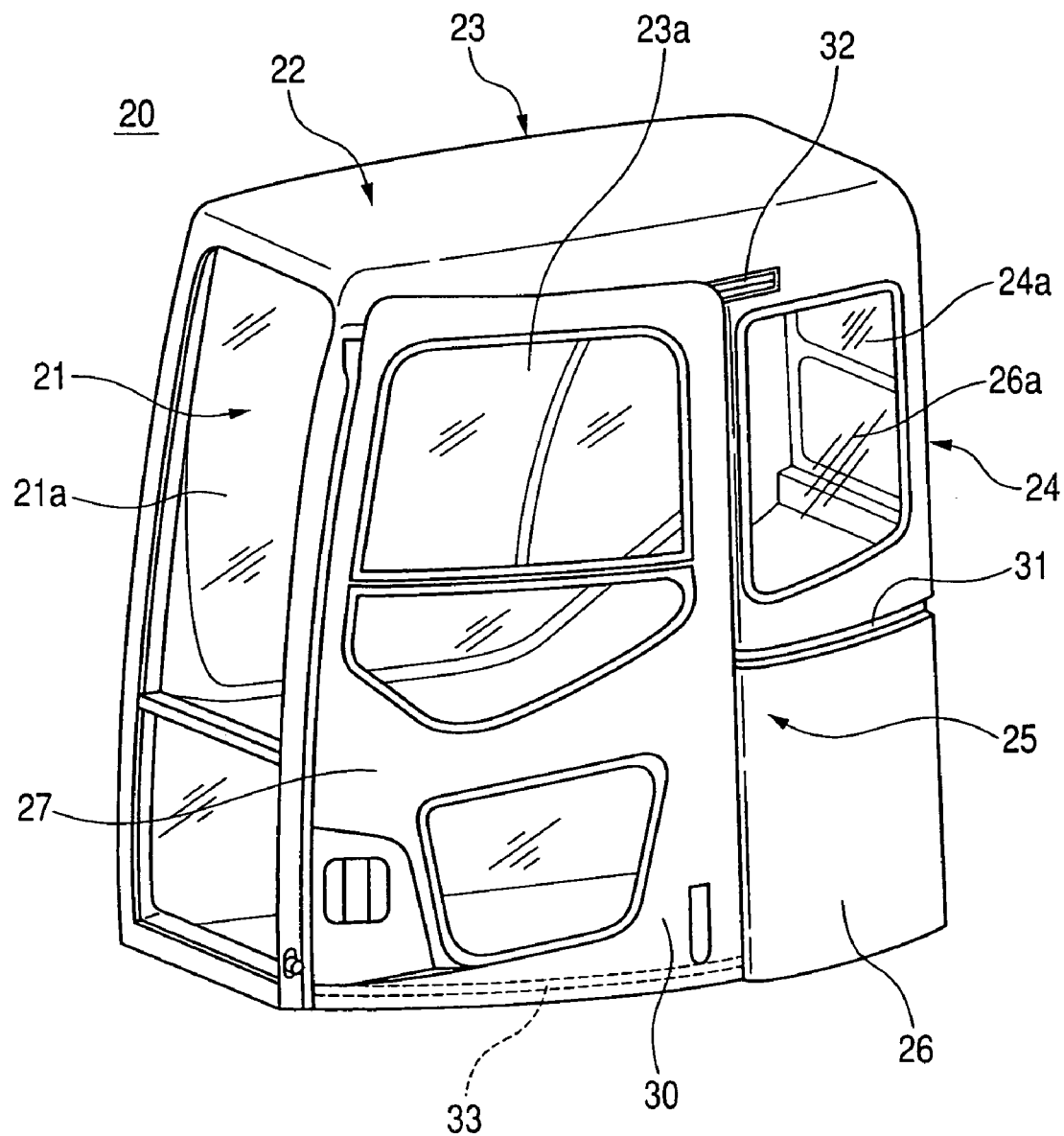
FIG. 3 is a perspective view showing the external appearance of a related art cab.

Referring to FIG. 1 and FIG. 2, a cab 10 is provided in the position on a turntable 3 which is offset from the center C of a swinging movement thereof. An outer side portion 11 constituting a side wall surface of the cab 10 is made so as to have an outwardly bulging curved surface. A slide door 12 opened and closed as the door is moved slidingly along the curved surface is provided at a front section of the outer side portion 11, and a rear wall surface portion at a rear section of the same. An outer edge (a broken line shows the slide door 12 in an opened state) of an orbit of opening and closing movements of the slide door 12 is adapted to stay on the inner side of a turning radius R of an outer edge portion of the turntable 3.

At the left and right sides of a front end portion of the cab 10, support posts 14a, 14b are provided, and, at a front end part of the rear wall surface section of the outer side portion 11, a support post 14c. At a longitudinally intermediate section of the inner side portion 13 of the cab 10, a support post 14d is provided, and, at a rear section of the support post 14d, flat glass 15 is fixed. The cab 10 is provided at a rear portion thereof with outwardly bulging two-dimensionally curved rear glass 16, an outer edge of which is adapted to stay on the inner side of the turning radius R of the outer edge portion of the upper turntable 3. The outer side portion 11 is provided at the rear wall surface section thereof with two-dimensionally curved glass 17.

The radius of curvature A1 of the rear curved glass 16 is equal to that A2 of the side curved glass 17. The contact portions of the flat glass 15 and side curved glass 17 and those of the rear curved glass 16 are bonded together and sealed with, for example, a silicone agent.

The cab 10 is provided therein with an operator's seat 40 having a back 41 capable of being reclined. A clearance L between the back 41 and rear curved glass 16 can be set larger than that of M in a related art cab since the rear curved glass 16 is bent outward. Therefore, the reclining angle α of the back can be set larger than that β thereof in the related art cab.

Since the slide door-carrying cab according to the present invention is formed as described above, the following effects are displayed. The outwardly bulging rear curved glass 16 is provided on the outer side of the rear portion of the cab 10 so that the glass 16 stays within the turning radius of the outer edge portion of the upper turntable 3. Accordingly, there is not a fear of causing the rear curved glass 16 to contact an outside obstacle during a swinging movement of the turntable 3. Since the clearance between the back 41 of the operator's seat 40 and rear curved glass 16 can be set larger than that between the corresponding parts of the related art cab, a space in which, for example, a tool box is placed can be secured sufficiently in the clearance. Moreover, the angle at which the operator's seat 40 is reclined becomes larger than that at which the operators seat in the related art cab is reclined, so that the operator can take a break in a comfortable posture during a rest period. This enables the operator's comfort in the cab when he works and rests therein to be improved.

Since support posts are not provided in the left and right rear corner portions of the cab 10, the rear visual range is widened. The external appearance of the cab is improved since the glass in the rear portion thereof is made curvilinearly. Moreover, when the radius of curvature of the rear curved glass 16 and that of the side curved glass 17 are set equal to each other, the same mold can be used in common with these glasses during the manufacturing thereof, and this enables the cost to be reduced.

What is claimed is:

1. A slide door-carrying cab for a construction machine, wherein the cab is provided in a position which is offset from a center of pivotal movement of a turntable, which is pivotally mounted on a traveling gear, the cab comprising:
an outer side portion having a curved surface so that curved surface bulges outward, the outer side portion including a sliding door, the sliding door being opened and closed by sliding along a curved path that generally follows the curved surface of the outer side portion, wherein the sliding door remains within a turning radius of an outer edge portion of the turntable, in any position along the curved path
an inner side portion, and
a rear portion extending between the outer side portion and the inner side portion, wherein the rear portion includes a rear curved glass that bulges outwardly and that is entirely located within the turning radius.

* * * * *